(12) United States Patent
Hwang et al.

(10) Patent No.: US 6,775,401 B2
(45) Date of Patent: Aug. 10, 2004

(54) SUBVOXEL PROCESSING: A METHOD FOR REDUCING PARTIAL VOLUME BLURRING

(75) Inventors: Scott N. Hwang, Chester Springs, PA (US); Felix W. Wehrli, Bala Cynwyd, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 546 days.

(21) Appl. No.: 09/820,225

(22) Filed: Mar. 28, 2001

(65) Prior Publication Data

US 2002/0015517 A1 Feb. 7, 2002

Related U.S. Application Data

(60) Provisional application No. 60/192,975, filed on Mar. 29, 2000.

(51) Int. Cl.$^7$ ................................. G06K 9/00

(52) U.S. Cl. ...................................... 382/131

(58) Field of Search ................................ 382/128, 130, 382/131, 132; 378/4, 8, 16, 21, 22, 63, 98.7; 250/370.08, 370.09, 559.05, 559.07; 600/410, 425, 443, 463

(56) References Cited

U.S. PATENT DOCUMENTS 4,719,585 A * 1/1988 Cline et al. .................. 345/424
5,412,703 A * 5/1995 Goodenough et al. ......... 378/8

OTHER PUBLICATIONS

"Extraction of Subvoxel Resolution Trabecular Bone Architecture from NMR Microscopy" By Wu et al., IEEE, Nuclear Science Symposium and Medical Imaging Conference, 1993.*

Gomberg BR, Saha PK, Song HK, Hwang SN, Wehrli FW "Topological Analysis Of Trabecular Bone MR Images" *IEEE Trans. Med. Imaging* 19:166–174 (2000).

Gordon CL, Webber CE, Christoforou N, Nahmias C "In Vivo Assessment Of Trabecular Bone Structure At The Distal Radius From High–Resolution Magnetic Resonance Images" *Med. Phys.* 24:585–593 (1997).

Gudbjartsson H, Patz S "The Rician Distribution Of Noisy MRI Data" *Magn. Reson. Med.* 34:910–914 (1995).

(List continued on next page.)

*Primary Examiner*—Andrew W. Johns
*Assistant Examiner*—Shervin Nakhjavan
(74) *Attorney, Agent, or Firm*—Evelyn H. McConathy; Dilworth Paxson LLP (57) ABSTRACT

The present invention comprises a novel method, system and device for post-processing images, such as trabecular bone images, obtained by MRI, CT, or other image technologies, to provide increasing apparent image resolution and to alleviate the effects of partial volume blurring, which otherwise precludes accurate measurement of structures in the limited-resolution regime in which image voxel size is larger than the typical structural element to be resolved. Since acquiring images at increased resolution often exacts an unacceptable signal-to-noise penalty, methods and systems to alleviate the adverse effects of partial volume blurring are instrumental for the accurate measurement of architectural parameters in applications, such as predicting the mechanical competence of trabecular bone networks. Referred to as "subvoxel processing," the invention is applicable to volumes of interest containing material phases of two discrete signal intensities, and it has been shown to be significantly more accurate than trilinear interpolation in decreasing apparent voxel size, especially in the presence of noise.

20 Claims, 11 Drawing Sheets

OTHER PUBLICATIONS

Hildebrand T, Laib A, Müller R, Dequeker J, Rüegsegger P "Direct Three–Dimensional Morphometric Analysis Of Human Cancellous Bone: Microstructural Data From Spine, Femur, Iliac Crest, And Calcaneus" *J. Bone Miner. Res.* 14:1167–1174 (1999).

Hwang SN, Wehrli FW "Estimating Voxel Volume Fractions Of Trabecular Bone On The Basis Of Magnetic Resonance Images Acquired In Vivo" *Int. J. Imaging Syst. Technol.* 10:186–198 (1999).

Hwang SN, Wehrli FW "Subvoxel Processing: A New Method For Alleviating Partial Volume Blurring In MR Images Of Trabecular Bone" *Proceedings of the International Society of Magnetic Resonance in Medicine* 2134 (2000).

Laib A, Hauselmann HJ, Ruegsegger P "In Vivo High Resolution 3–D–QCT Of The Human Forearm" *Technol. Health Care* 6:329–337 (1998).

Link TM, Majumdar S., Augat P. Lin JC, Newitt D, Lu Y, Lane NE, Genant HK, "In Vivo High Resolution MRI Of The Calcaneous: Differences In Trabecular Structure In Osteoporosis Patients" *J. Bone Miner. Res.* 13:1175–1182 (1998).

Ma J, Wehrli FW, Song HK "Fast 3D Large–Angle Spin–Echo Imaging (3D FLASE)" *Magn. Reson. Med.* 35:903–910 (1996).

Majumdar S, Genant HK, Grampp S, Newitt DC, Truong VH, Lin JC, Mathur A "Correlation Of Trabecular Bone Structure With Age, Bone Mineral Density, And Osteoporotic Status: In Vivo Studies In The Distal Radius Using High Resolution Magnetic Resonance Imaging" *J. Bone Biner. Res.* 12:111–118 (1997).

Müller R, T H, Häuselmann HJ, Rüegsegger P "In Vivo Reproducibility Of Three–Dimensional Structural Properties Of Noninvasive Bone Biopsies Using 3D–pQCT" *J. Bone Miner. Res.* 11:1745–1750 (1996).

Pothuaud L, Porion P, Lespessailles E, Benhamou CL, Levitz P "A New Method For Three–Dimensional Skeleton Graph Analysis Of Porous Media: Application To Trabecular Bone Microarchitecture" *J. Microsc.* 199:149–161.

Saha PK Gomberg BR, Wehrli FW "Three–Dimensional Digital Topological Characterization Of Cancellous Bone Architecture" *Int. J. Imaging Sys. Tecnol.* 11:81–90 (2000).

Song HK, Wehrli FW "In Vivo Micro–Imaging Using Alternating Navigator Echoes With Applications To Cancellous Bone Structural Analysis" *Magn. Reson. Med.* 41:947–953 (1999).

Wehrli FW, Hwang SN, Ma J, Song HK, Ford JC, Haddad JG "Cancellous Bone Volume And Structure In The Forearm: Noninvasive Assessment With MR Microimaging And Image Processing" *Radiology* 206:347–357 (1998).

Wehrli FW, Gomberg BR, Saha PK, Song HK, Hwang SN, Synder PJ "Digital Topological Analysis Of In Vivo MR Microimages Of Trabecular Bone Reveals Structural Implications Of Osteoporosis" *J. Bone Miner. Res.* (2001).

Wu Z, Chung H–W, Wehrli FW "A Bayesian Approach to Subvoxel Tissue Classification In NMR Microscopic Images Of Trabecular Bone" *Magn. Reson. Med.* 31:302–308 (1994).

* cited by examiner

| 0 | 0.3 | 0.4 |
|---|---|---|
| 0 | d \| a <br> c \| b | 0.6 |
| 0 | 0 | 0.5 |

A

| 0 | 0.3 | 0.4 |
|---|---|---|
| 0 | 0.09 \| 0.38 <br> 0 \| 0.33 | 0.6 |
| 0 | 0 | 0.5 |

☐ = marrow
■ = bone

|   |   |   |
|---|---|---|
| 0 | 0.3 | 0.4 |
| 0 | 0 \| 0.43 <br> 0 \| 0.37 | 0.6 |
| 0 | 0 | 0.5 |

SUBVOXEL PROCESSING: A METHOD FOR REDUCING PARTIAL VOLUME BLURRING

REFERENCE TO RELATED APPLICATIONS

This application claims priority to U.S. Provisional Application No. 60/192,975, filed Mar. 29, 2000.

GOVERNMENT SUPPORT

This work was supported in part by grants from the National Institutes of Health, grant numbers RO1 41443 and RO1 40671. The government may have certain rights in this invention.

FIELD OF THE INVENTION

This invention relates generally to the field of post-processing of images, such as trabecular bone images, obtained by MRI, CT, or other image technologies to increase apparent image resolution without partial volume blurring for structural dimensions in which image voxel size is larger than the typical structural element to be resolved, and to the use of these parameters to determine trabecular network strength as a risk factor in the assessment of osteoporosis.

BACKGROUND OF THE INVENTION

Magnetic Resonance Imaging (MRI) is a powerful tool for noninvasively quantifying tissue morphology. However, when voxel size is larger than the structures of interest, partial volume blurring complicates accurate measurement of structural parameters. On the other hand, acquisition of images at higher resolution often exacts an unacceptable signal-to-noise penalty, and thus, does not represent a viable alternative. For example, these constraints have been the major obstacle to the development of MRI as a means of quantifying trabecular bone architecture in vivo for the purpose of predicting fracture risk in osteopenic subjects (Link et al., *J. Bone Miner. Res.* 13:1175–1182 (1998); Wehrli et al., *Radiology* 206:347–357 (1998); Majumdar et al., *J. Bone Miner. Res.* 12:111–118 (1997); Gordon et al., *Med. Phys.* 24:585–593 (1997)).

Trabecular bone (TB) (also known as cancellous bone), which makes up most of the axial skeleton and ends near the joints of the long bones, consists of a lattice of interconnected plates and rods that confer mechanical strength to the skeleton at minimum weight. However, there is growing evidence that in addition to the volume fraction of the bone (often quantified in terms of bone density), the three-dimensional (3D) arrangement of the trabecular network is a major determinant of elastic modulus and ultimate strength.

In general, characterization of the strength of trabecular lattices from three-dimensional (3D) images can be divided into three major categories: material, scale and topology (DeHoff et al., *J. Microscopy* 95:69–91 (1972)). 'Material properties' describe the bone material; 'scale properties' describe the size and thickness (local volume properties) of the trabecular elements; and the 'topological properties' describe the spatial arrangement of the bone material in the network. These parameters change characteristically with subject age.

A common diagnostic screening method for osteoporosis is based on 'dual-energy X-ray absorptiometry' (DEXA) (Wahner et al., *The Evaluation of Osteoporosis: Dual Energy X-Ray Absorptiometry in Clinical Practice*, Cambridge: University Press, 1994) to measure integral bone mineral density (BMD). This method, however, does not distinguish between trabecular and cortical bone and ignores the role of structure as a contributor to mechanical competence.

Since trabecular thickness (80–150 $\mu$m) is typically less than the achievable voxel size in vivo (~150 $\mu$m), accurate structural information is difficult to obtain. The common approach toward quantifying trabecular structure has been to classify voxels as either "bone" or "marrow" via binary segmentation. In the low spatial-resolution regime, however, the "bone" voxels contain varying amounts of bone, usually with a higher proportion of marrow. Therefore, to avoid the loss of information inherent in binary classification, a means of estimating the bone volume fraction (BVF) in each voxel (Hwang et al., *Int. J Imaging Syst. Technol.* 10:186–198 (1999)) was devised, referred to as BVF mapping. Linear interpolation has commonly been applied to increase the apparent resolution of digital images. In one dimension, for example, BVF at a spatial location between the centers of two adjacent voxels would be computed as the average of the two voxels. As a result, additional values calculated in this manner can never increase beyond the original values, and thus, contradict the axiom that smaller voxels are more likely to contain larger fractions of bone.

Clearly, there remains a need in the art to increase the apparent resolution of the BVF map, and to overcome the partial volume blurring which presently precludes accurate measurement of structural dimensions in the limited-resolution regime in which image voxel size is larger than the typical structural element to be resolved. Since acquiring images at increased resolution often exacts an unacceptable signal-to-noise penalty, methods to alleviate the adverse effects of partial volume blurring are instrumental for the accurate measurement of architectural parameters in applications, such as predicting the mechanical competence of trabecular bone networks. Once they have been accurately measured, parameters for quantifying the visible differences in architecture have recently been derived and applied to predict fracture risk (Wehrli et al., *J. Bone Miner. Res.* (2001) in press).

Prior to the present invention, even with the most advanced technology, it has not been possible to obtain images of trabecular architecture in vivo at a resolution better than trabecular thickness. In the distal radius, voxel sizes reported by MR range from $5.5 \times 10^{-3}$ mm$^3$ (Song et al, *Magn. Reson. Med.* 41:947–953 (1999)) to $12 \times 10^{-3}$ mm$^3$ (Majumdar et al., 1997), corresponding to a mean linear resolution of 187 and 257 $\mu$m, respectively. In peripheral quantitative computed tomography (p-QCT) of the wrist, the smallest reported voxel size is 160 $\mu$m (Laib et al., *Technol. Health Care* 6:329–337 (1998)). However, the point-spread function is considerably wider in CT than in MR, resulting in an effective resolution closer to 300 $\mu$m. Realizing the limitations of image resolution, Majumdar et al., 1997 refer to the derived histomorphometric measures as "apparent." Müller et al. demonstrated excellent serial reproducibility in histomorphometric parameters obtained in vivo in the distal radius of test subjects by p-QCT (Müller et al., *J. Bone Miner. Res.* 11: 1745–1750 (1996)), even though the reported trabecular thickness values were overestimated by at least a factor of 2. While apparent histomorphometric measures may still be useful as long as they track true variations in these parameters, analytical approaches aimed at deriving topological parameters (Pothuaud et al., *J. Microsc.* 199:149–161 (2000); Saha et al., *Int. J. Imaging Sys. Technol.* 11:81–90 (2000); Gomberg et al., *IEEE Trans. Med. Imaging* 19:166–174 (2000); Hildebrand et al, *J. Bone*

*Miner. Res.* 14:1167–1174 (1999)) are unlikely to yield meaningful parameters at in vivo resolution without enhancement of the apparent resolution.

SUMMARY OF THE INVENTION

The present invention comprises a novel image post-processing method, system and device for increasing apparent image resolution of images, such as trabecular bone images, obtained by MRI, CT, or other image technologies. Referred to as "subvoxel processing," the method and system are applicable to volumes of interest containing material phases of two discrete signal intensities.

The accuracy of the method has been demonstrated by nonlimiting example, using a micro-computed tomography ($\mu$-CT) image of human trabecular bone, to show that subvoxel processing is significantly more accurate than trilinear interpolation in decreasing apparent voxel size, especially in the presence of noise. In addition, the effectiveness of the method has been illustrated with MR images of human trabecular bone acquired in vivo, although it is also applicable ex vivo. The subvoxel-processed images were shown to have architectural features characteristic of images acquired at higher spatial resolution.

In a preferred embodiment of the invention, the method is illustrated with images of trabecular bone; however, the algorithm may easily be applied to images of other materials, which may be considered to locally contain only two phases. The method of Bayesian subvoxel classification (Wu et al., *Magn. Reson. Med.* 31:302–308 (1994)) also divides voxels into subvoxels; however in contrast to a preferred embodiment of the present invention, the Bayesian method produces its output as a binarized image, i.e., the subvoxels are constrained to contain either 100% bone or 100% marrow. By comparison, subvoxel processing of the preferred embodiment of the present invention assigns partial fractions to each subvoxel (Hwang et al., *Proc. Internat'l Soc. Magnetic Resonance Med.*, Denver, 2000, p. 2134, herein incorporated by reference).

A preferred embodiment of the invention provides a method to increase apparent image resolution by post-processing an image of a volume comprising material phases having at least two discrete signal intensities, wherein the method comprises: algorithmically subdividing each voxel of the image into subvoxels; assigning voxel intensities (weights) to each subvoxel computed on the basis of local neighborhood criteria and strict mass conservation; and automatically computing a resolution-enhanced image by retaining the original spatial locations of the subvoxels, which have been sorted in terms of assigned weights.

Another preferred embodiment of the invention provides a system to increase apparent image resolution by post-processing an image of a volume comprising material phases having at least two discrete signal intensities, wherein the system comprises: at least one means for algorithmically subdividing each voxel of the image into subvoxels; at least one means for assigning voxel intensities (weights) to each subvoxel computed on the basis of local neighborhood criteria and strict mass conservation; and at least one means for automatically computing a resolution-enhanced image by retaining the original spatial locations of the subvoxels, which have been sorted in terms of assigned weights.

Yet another preferred embodiment of the invention provides a device to increase apparent image resolution by post-processing an image of a volume comprising material phases having at least two discrete signal intensities, wherein the device comprises: a computer-readable signal-bearing medium; at least one means in the medium for algorithmically subdividing each voxel of the image into subvoxels; at least one means in the medium for assigning voxel intensities (weights) to each subvoxel computed on the basis of local neighborhood criteria and strict mass conservation; and at least one means in the medium for automatically computing a resolution-enhanced image by retaining the original spatial locations of the subvoxels, which have been sorted in terms of assigned weights.

In each preferred embodiment, the images may be obtained by any known imaging process, including, for example, MRI, CT, ultrasound, nuclear imaging, included emission tomography modalities, microscopy (light or electron), photography, x-ray projection and optical digital imaging.

Moreover, it is provided an embodiment in which subdividing each voxel further comprises subdividing each voxel into eight subvoxels by strictly enforcing conservation of bone mass, such that total solid volume fraction in the original voxel is divided among the subvoxels on a weighted basis, and subvoxels are sorted in order of decreasing weight. A subvoxel is determined by the amount and location of solid outside the voxel, but adjacent to the subvoxel; and wherein the weight for each subvoxel is computed as the sum of the voxels adjacent to that subvoxel. Blurring of the image is eliminated by a repeated algorithmic process, comprising classifying each subvoxel as a boundary subvoxel or a central subvoxel, based upon output of the original weighting determination, wherein (i) solid-containing subvoxels are classified as boundary or central subvoxels on the basis of adjacency and connectivity criteria; (ii) boundary subvoxels are not assigned a solid weight until the central voxels contain 100% solid; (iii) central subvoxels are filled with solid by assigning primary and secondary weights, wherein solid is partitioned among the subvoxels on the basis of the primary weights; and (iv) boundary subvoxels are similarly filled based upon secondary weights, but the primary weights are set to zero.

It is further provided in a preferred embodiment that the subvoxels may be further sorted in order of decreasing primary weights, and yet further sorted within the same primary weight in order of decreasing secondary weights.

Additional objects, advantages and novel features of the invention will be set forth in part in the description, examples and figures which follow, and in part will become apparent to those skilled in the art on examination of the following, or may be learned by practice of the invention.

DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown.

In FIG. 1A, the central voxel has been partitioned into subvoxels a through d. In FIG. 1B, the computed BVF's of the subvoxels are shown based upon an assumption that the BVF of the central voxel is 0.20. The average of the BVFs of the subvoxel (i.e., [0.38+0.33+0+0.09]/4)=0.20, in accordance with the condition that total mass be conserved.

FIGS. 2–2D graphically depict multi-pass processing. In FIG. 2A, a single trabecula (gray) is shown partially filling two rows in an array of voxels delineated by dashed lines. In FIG. 2B, a BVF map of the array in FIG. 2A is shown in which increased intensity indicates higher BVF (i.e., black and white indicate BVF=0 and BVF=1, respectively). In FIG. 2C, although single-pass subvoxel processing allocates more bone to the central rows of subvoxels, it is shown that none of them contain 100% bone. In FIG. 2D, after the second-pass processing, the trabecula is shown as only comprising three rows of subvoxels, and the central subvoxels have been correctly assigned BVF=1.

FIGS. 3–3C graphically depict local connectivity for a central bone voxel (black), which is defined as the number of objects a particular pixel might connect in 2D, as determined from its eight (8) nearest neighbors (or its 26 neighbors in 3D). The connectivity may be obtained by counting the number of isolated "islands" of bone generated by reclassifying the central voxel as marrow. In FIG. 3A, Connectivity =0, meaning that reclassifying the central voxel does not disconnect any regions. In FIG. 3B, Connectivity=1. In FIG. 3C, Connectivity=2, meaning that reclassifying the central voxel apparently disconnects the bone voxels in the corners, even though they might still be connected outside the local neighborhood.

In FIG. 4A, in the first pass algorithm, the weight for the subvoxel shown in black is computed as the sum of the hatched subvoxels. In FIG. 4B, during subsequent passes, the adjacent hatched subvoxels are, instead, used to determine the weight for the subvoxel shown in black.

FIG. 5 depicts a modified single-pass algorithm as applied to the array of voxels shown in FIG. 1A. Since the subvoxel in the upper left corner does not have any bone towards its left side, it was assigned a primary weight of zero. In contrast to the single-pass result shown in FIG. 1B, the subvoxel was thus assigned BVF=0, and its bone was partitioned among the voxels towards the center of the trabecula.

FIG. 6A shows one of 416 cross-sectional slices of an unprocessed 3D $\mu$-CT image ($22\times22\times22$ $\mu m^3$ voxel size) of a human radius. FIG. 6B shows a cross section of the 'gold standard' BVF map ($33\times33\times22$ $\mu m^3$ voxel size), wherein voxel intensity is proportional to BVF (i. e., black= no bone). FIG. 6C shows a cross section of the noiseless, low resolution BVF map ($132\times132\times352$ $\mu m^3$ voxel size). FIG. 6D shows a cross section of the test image ($132\times132\times352$ $\mu m^3$ voxel size, SNR=10). FIG. 6E shows a cross section of the result of applying fast-BVF mapping to the image in FIG. 6D.

FIG. 7A shows the image from a 60-year-old woman (DEXA BMD L2–4 spine T-score=0.3). FIG. 7B shows the image of a 63-year-old woman (T-score=1.11). The images were acquired at 1.5T using the FLASE partial flip-angle spin-echo pulse sequence, at a voxel size of $137\times137\times350$ $\mu m^3$. Both data sets were subvoxel processed and projected in 3D to highlight the differences in architecture.

FIGS. 8–8F depict trilinear interpolation of the images shown in FIG. 6. In FIG. 8A, trilinear interpolation decreases the apparent voxel size of the low-resolution BVF map from FIG. 6C to that of the gold standard, but the low intensities demonstrate that BVF does not increase in any of the voxels. In FIG. 8B, the image blurring is particularly evident when all voxels with BVF>0 are shown in white. In FIG. 8C, the histogram of error shows that only 30.9% of the subvoxels have zero error (i.e., were previously assigned the correct BVF) and that the average absolute error was 17.72. By comparison, in FIGS. 8A–8F, the analogous images and histogram depict the result of applying trilinear interpolation to the test image with SNR=10 (FIG. 6D). The grayscale in FIG. 8D is different from the one in FIG. 8A because noise results in negative values. The histogram in FIG. 8F shows that <4% of the subvoxels were originally assigned correct BVF.

FIG. 9A shows that applying subvoxel processing to the noiseless low-resolution BVF map in FIG. 6B results in an increase in apparent resolution without blurring trabeculae. In FIG. 9B, the BVF map was binarized by displaying all subvoxels with BVF>0 in white to accentuate any blurring. The binarized image looks nearly identical to the BVF map in FIG. 9A since blurring is essentially nonexistent. FIG. 9C depicts the error histogram. In FIGS. 9D–9F, the analogous images and error histograms are shown for the result of applying fast BVF mapping and subvoxel processing to the test image with SNR=10 from FIG. 6D. The error histograms show that classification accuracy is very nearly the same at infinite SNR (FIG. 9C) and at SNR=10 (FIG. 9F).

FIG. 10A depicts data from the gold standard. FIG. 10B depicts the result of subvoxel processing. FIG. 10C depicts the output of trilinear interpolation. The images in FIGS. 10A–10C were projected after binarizing the data with a threshold of BVF=0.5. Note that horizontal trabeculae are better preserved in the subvoxel-processed images in spite of the initially low image resolution and noise. The projection image in FIG. 10D also shows trilinearly interpolated data, but the trabeculae were artificially thickened by classifying voxels with BVF>0.25 as bone.

In FIG. 11B, the image is shown following subovoxel processing. The architectural differences are evident, especially the central clearing of trabeculae in FIG. 11B, in which the sheet-like nature of the trabeculae are also visualized.

DESCRIPTION OF PREFERRED EMBODIMENTS OF THE INVENTION

The present invention comprises a novel image post-processing method, referred to as "subvoxel processing," as well as system and device, for increasing apparent image resolution for images, such as trabecular bone images, obtained by MRI, CT, or other image technologies. Subvoxel processing is applicable to volumes of interest containing material phases of two discrete signal intensities. A preferred embodiment of the invention comprises algorithmically subdividing the voxels, and assigning voxel intensities to each subvoxel on the basis of local neighborhood criteria and strict mass conservation.

Digital topology deals with 'binary images,' which are herein defined as 3D matrices of voxels whose positions are represented by a vector of Cartesian coordinates, $x=(x_1, x_2, X_3)$, and whose voxels can have only one of two values, bone or marrow. Such an image is usually obtained by binarizing a gray-scale intensity image, such as an image wherein the intensities represent the bone volume fraction (BVF) occupied by each voxel.

The basis of digital topology relies on calculating the number of objects, tunnels, and cavities in the immediate neighborhood of each bone voxel. However, before proceeding further, it is essential to first understand the mathematical basis of digital topological analysis in the context of trabecular bone images. Most digital imaging systems produce images on a rectangular grid where the basic image elements, referred to as "spels," are hypercuboids. The term "spels" is an abbreviation for spatial elements; in 2D spels are 'pixels,' while in 3D they are 'voxels.' Mathematically, this is explained by letting n-dimensional Euclidean space $\Re^n$ be divided into hyper cuboids by n orthogonal families, each of equally distant parallel planes.

To satisfy the Jordan curve theorem, bone objects are defined as 26-objects of bone voxels (i.e., 26-connected), and marrow objects (background) are 6-objects of marrow voxels (Rosenfeld, *Information and Control* 26:24–33 (1974); Kong et al., *Computer Vision Graphics and Image Processing* 48:357–393 (1989)).

Single-Pass Subvoxel Processing

Subvoxel processing is based on two assumptions: (1) smaller voxels are more likely to have high BVF and (2) bone is generally in close proximity to more bone. The starting point of the algorithm is the partitioning of each voxel into eight subvoxels by strictly enforcing conservation of bone mass, i.e., the total BVF in the original voxel is divided among the subvoxels. The precise amount allotted to a subvoxel is determined by the amount and location of bone outside the voxel, but adjacent to the subvoxel. Thus, bone tends to be sequestered in the area of the voxel that is closest to other bone.

The images subjected to subvoxel processing are assumed to be BVF maps, i.e. the value of each voxel is equal to the volume fraction occupied by bone. The principle is illustrated in two dimensions with a 3×3 array of voxels in which the central voxel (BVF=0.2) has been partitioned into four subvoxels (FIG. 1A). The weight for a subvoxel, $w_{subvoxel}$, is computed as the sum of the voxels adjacent to the subvoxel. The number of adjacent voxels is $2^N-1$, where N is the dimensionality of the image array. For example, the weight for subvoxel "a" is obtained as the sum of the three adjacent voxel BVFs (i.e., 0.3+0.4+0.6=1.3). Similarly, the weights for subvoxels b, c, and d are 1.1, zero, and 0.3, respectively. In three dimensions (3D), there are seven adjacent voxels.

The bone is then partitioned among the subvoxels according to their relative weights. The absolute volume of bone in the voxel, $BV_{voxel}$, is equal to the product of $BVF_{voxel}$, the bone volume fraction of the voxel, and $V_{voxel}$, the volume of the voxel. The volume of bone allotted to a subvoxel, $BV_{subvoxel}$, is thus:

$$BV_{subvoxel} = \frac{w_{subvoxel}}{w_{total}} \times BV_{voxel} \qquad \text{[Equation 1]}$$

wherein $w_{total}$ is the sum of the weights from all subvoxels in the voxel. The subvoxel BVF is, subsequently, given by Equation 2

$$BVF_{subvoxel} = \frac{BV_{subvoxel}}{V_{subvoxel}} = \qquad \text{[Eq. 2]}$$

$$\frac{w_{subvoxel}}{w_{total}} \times BVF_{voxel} \times \frac{V_{voxel}}{V_{subvoxel}} = \frac{w_{subvoxel}}{w_{total}} \times BVF_{voxel} \times 2^N$$

Note that the product $BVF_{voxel} \times 2^N$ is equal to the sum of BVF from all the subvoxels in the voxel. For the example in FIG. 1, the sum of weights is 2.7. Thus 1.3/2.7=0.48 of the bone volume is allotted to subvoxel "a," yielding a BVF of 0.48×0.2×4=0.38.

If voxel BVF is high, a subvoxel may be assigned an unrealistic BVF>1. For example, if the center voxel had a BVF of 0.9, the resulting $BVF_{subvoxel}$ for "a" would be 1.7. In such a case, the subvoxel is assigned a BVF of 1, and the residual bone is partitioned among the other subvoxels according to the remaining weights. For each voxel, the algorithm, therefore, processes each subvoxel in order of decreasing weight. The BVF assigned to each subvoxel is determined from the subvoxel's weight, and then subtracted from the remaining bone in the voxel. In order to express this algorithm mathematically, each subvoxel in a voxel may be referenced by the subscript n, where n is an integer ranging from 0 through $2^N-1$. The subscripts reference each subvoxel in order of decreasing weight, such that subvoxel n must have a weight less than or equal to subvoxel n−1. Although the subvoxels are sorted in terms of decreasing weight, they are not rearranged in terms of spatial location. Since each subvoxel retains its original spatial location, the resolution-enhanced imaged is automatically computed when a BVF is assigned to each subvoxel. A residual sum of BVF may be defined as $$BVF_{residual,n} = 2^N \times BVF_{voxel} - \sum_{i=0}^{n-1} BVF_{subvoxel,i} \qquad \text{[Equation 3]}$$

wherein the subscript "i" refers to a specific subvoxel in a manner analogous to the subscript "n," but i can only assume an integer value ranging from 0 through n−1. The residual BVF for the first voxel is $BVF_{residual,0} = 2^{N \times BVF}{}_{voxel}$, the product which was noted in Equation 2 as the sum of BVF from all the subvoxels in the voxel. A residual sum of unprocessed subvoxel weights is also expressed as $$w_{total,n} = \sum_{i=n}^{2^N-1} w_{subvoxel,i} \qquad \text{[Equation 4]}$$

Subvoxel BVF is then given as in Equation 2, except that the sums of subvoxel BVF and of the weights are replaced by the residual sums of BVF and the weights. In addition, the minimum function, (min(a,b)), which returns the lesser of a and b, is applied to restrict BVF to values less than or equal to one:

$$BVF_{subvoxel,n} = \min\left(1, \frac{w_{subvoxel,n}}{w_{total,n}} \times BVF_{residual,n}\right) \qquad \text{[Equation 5]}$$

Multiple-Pass Algorithm

Trabeculae may still become artifactually diffuse with the single-pass algorithm. For example, consider the 2D horizontal trabecula represented by the array of voxels in FIG. 2A. After applying the single-pass subvoxel algorithm (FIG. 2B), bone has been preferentially allocated towards the two central rows of subvoxels, but none of them contains 100% bone. If it is assumed that the original spatial resolution is sufficiently high, such that there are no voxels that contain more than one trabecula, only subvoxels that are on the boundary of a trabecula should contain partial fractions of both bone and marrow.

Figure 2:
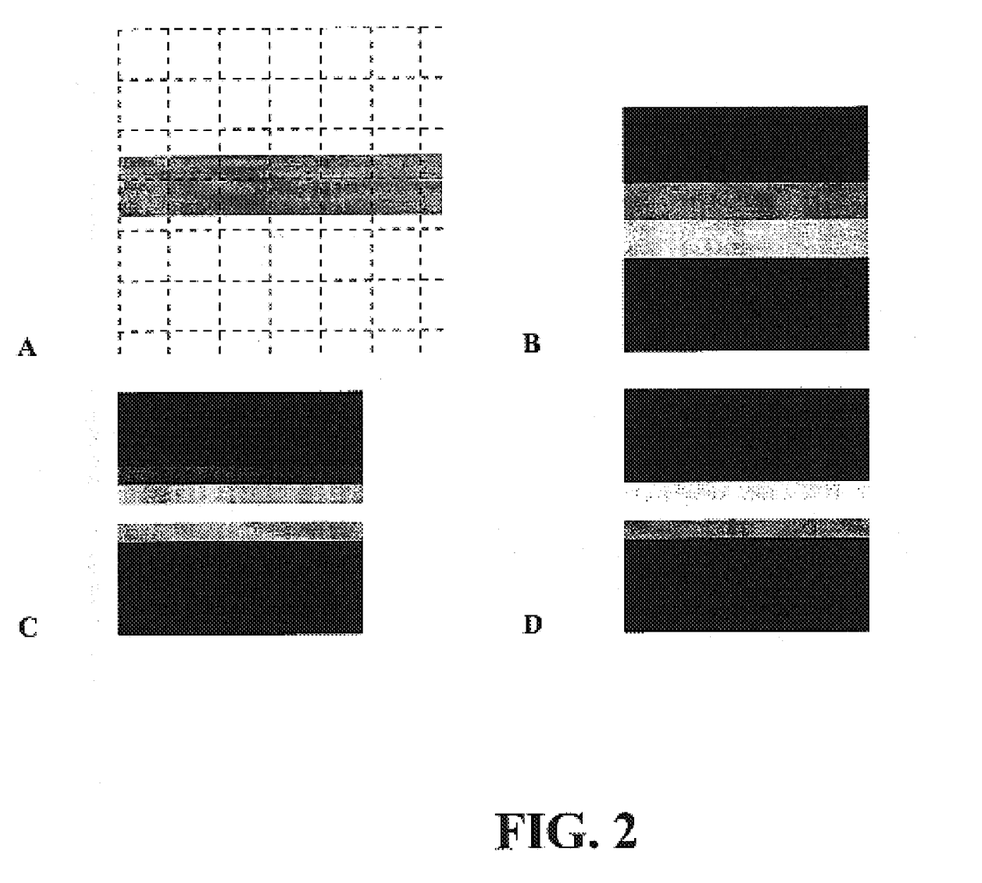

Blurred trabeculae may be completely eliminated by application of a multiple-pass algorithm. Subvoxels are classified as boundary or central subvoxels on the basis of the output of the first-pass algorithm. During subsequent passes, boundary subvoxels are not assigned bone until the central voxels contain 100% bone (FIG. 2C).

Figure 3:
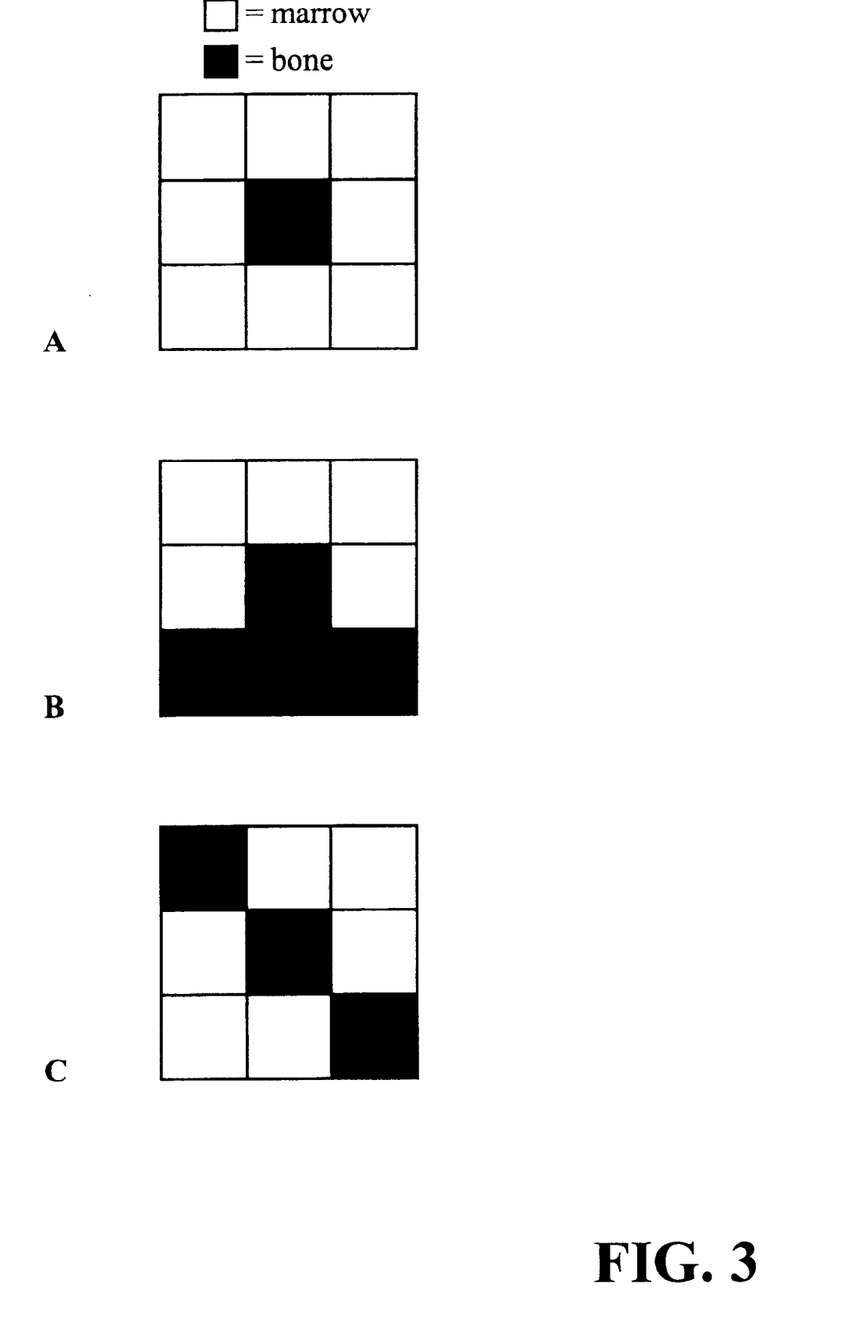

Bone-containing subvoxels are classified as boundary or central subvoxels on the basis of adjacency and connectivity criteria. The 'adjacency criterion' requires that one of the subvoxel's six nearest neighbors in 3D (four nearest neighbors in 2D) does not contain bone. A boundary subvoxel also must not be critical to the trabecular network as quantified by local connectivity. The local 'connectivity' is computed on the basis of the $3^N-1$ nearest neighbor previous-pass subvoxels. The 'connectivity' is equal to the number of "islands" of bone that are generated in the local neighborhood by temporarily assuming the central subvoxel contains marrow only (FIG. 3). If the edge subvoxel has a connectivity of less than two, its bone may be shifted to another voxel without damaging the connectivity of the network, and may thus be classified as a 'boundary voxel.' Subvoxels, which do not satisfy both of these criteria, are classified as 'central subvoxels.'

Figure 4:
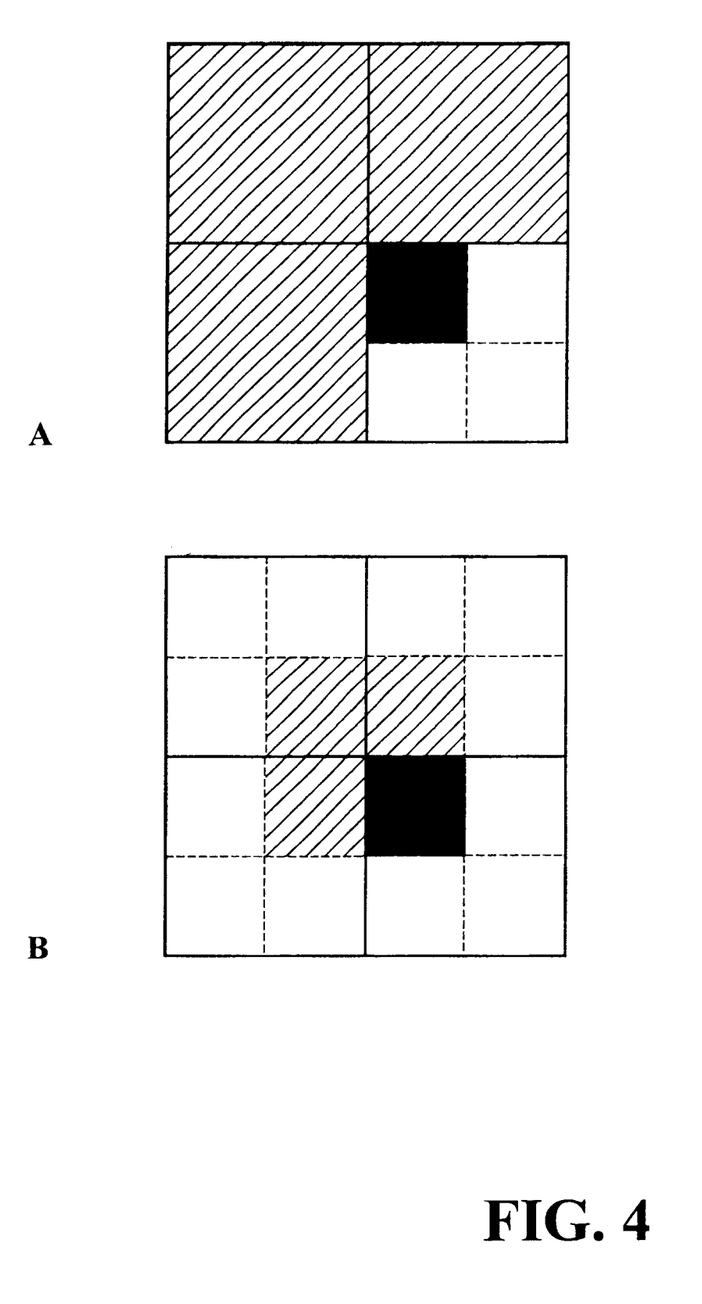
FIGS. 4A and 4B graphically depict computation of weights in 2D.

Central subvoxels are preferentially filled with bone by assigning subvoxels primary and secondary weights. Boundary voxels that are not critical to the trabecular network are assigned a primary weight of zero. Bone is then partitioned among the subvoxels on the basis of the primary weights. After the subvoxels with non-zero primary weights have been assigned bone, the remaining bone is partitioned among the subvoxels, which have not been assigned a BVF, according to the secondary weights. Weights may be computed as the weights in the single-pass algorithm. However, the current implementation of the algorithm further compacts the bone by calculating the secondary weights as the sum of the BVFs of the $2^N-1$ first-pass subvoxels, whose locations are adjacent to that of the second-pass subvoxel, but outside the voxel (FIG. 4). Central subvoxels only require primary weights, which are computed as described. For the boundary voxels, the secondary weights are obtained in the same manner, but the primary weights are set to zero.

As was done in the single-pass algorithm, subvoxels are sorted in order of decreasing primary weights, and those with the same primary weight are further sorted according to their secondary weights. Subvoxel BVFs are then computed in a manner similar to the single-pass algorithm using the following modified definitions:

$$BVF_{subvoxel,n} = \begin{cases} \min\left(1, \frac{w_{primary,n}}{w_{total,n}} \times BVF_{residual,n}\right), n < B \\ \min\left(1, \frac{w_{secondary,n}}{w_{total,n}} \times BVF_{residual,n}\right), n \geq B \end{cases}$$ [Equation 6]

$$w_{total,n} = \begin{cases} \sum_{i=n}^{2^N-1} w_{primary,n}, n < B \\ \sum_{i=n}^{2^N-1} w_{secondary,n}, n \geq B \end{cases}$$ [Equation 7]

wherein B is the index of the first subvoxel which is not a central subvoxel, i.e., the first voxel which has a zero primary weight. $BVF_{residual}$ is defined as previously stated in Equation 3. Since only the central subvoxels have nonzero primary weights, the boundary subvoxels are not assigned any bone unless all the central subvoxels are assigned BVF=1 (FIG. 2C).

Modified Single-Pass Algorithm

Figure 1:
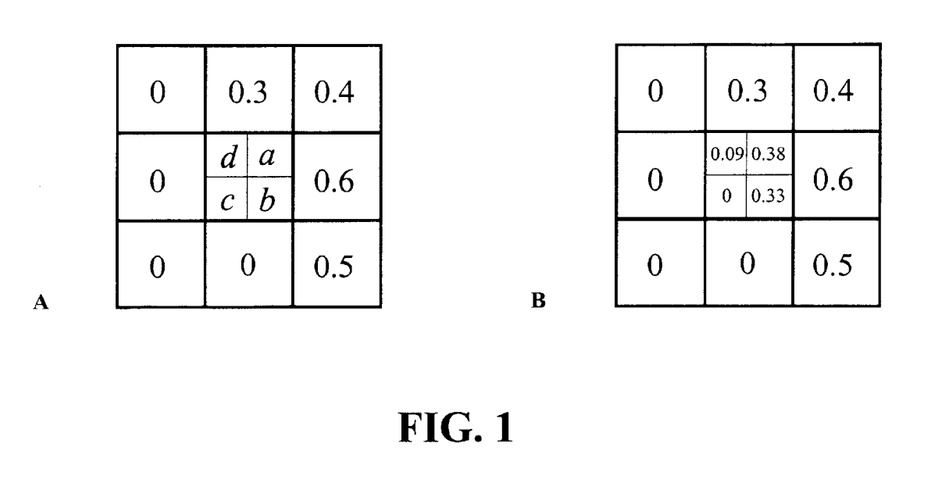
FIGS. 1A and 1B graphically depict an array of voxels.
Figure 5:
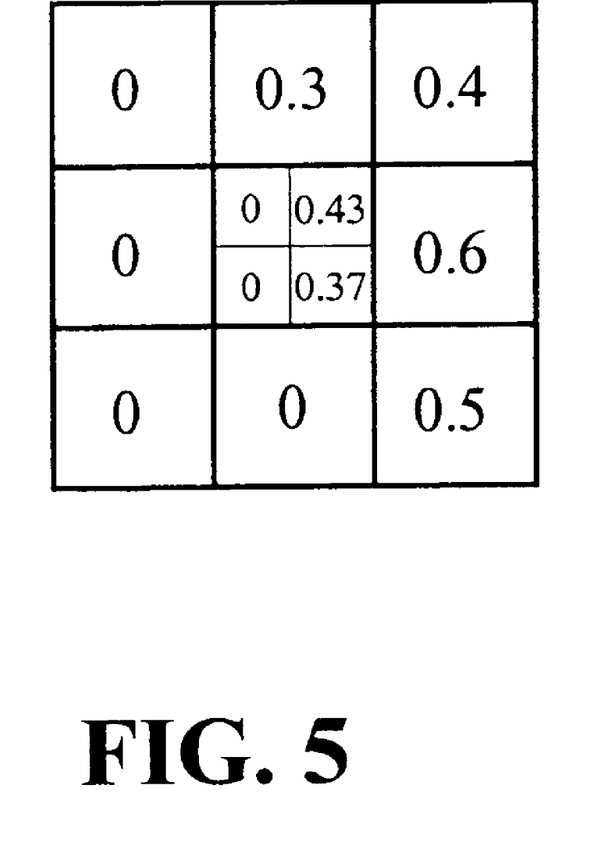

An alternative to multiple passes is to assign primary and secondary weights during the first pass. For example, a zero primary weight may be assigned to subvoxels which do not have at least bone-containing voxel 'attracting' bone to all of its exposed sides. For example, the boundary subvoxels in FIG. 5 are assigned a primary weight of zero since they all have one side which lacks a bone-containing voxel. All of the bone is thus shifted to the central subvoxels (FIG. 5C). Similarly, subvoxel d from the first example in FIG. 1 is assigned a zero primary weight by the modified algorithm since it has no voxels attracting bone from the left. Although the modified single-pass algorithm helps to keep the trabeculae from becoming diffuse, the multiple-pass algorithm is far more effective.

EXAMPLE

The invention is further described by example. This example, however, is provided for purposes of illustration to those skilled in the art, and is not intended to be limiting. Moreover, this example is not to be construed as limiting the scope of the appended claims. Thus, the invention should in no way be construed as being limited to the following example, but rather, should be construed to encompass any and all variations which become evident as a result of the teaching provided herein.

In the example that follows, all parameters are dimensionless, representing densities, defined as the number of image voxels, which are algorithmically subdivided, and each subvoxel is assigned a voxel intensity on the basis of local neighborhood criteria and strict mass conservation.

Simulated In Vivo Test Image

Figure 6:
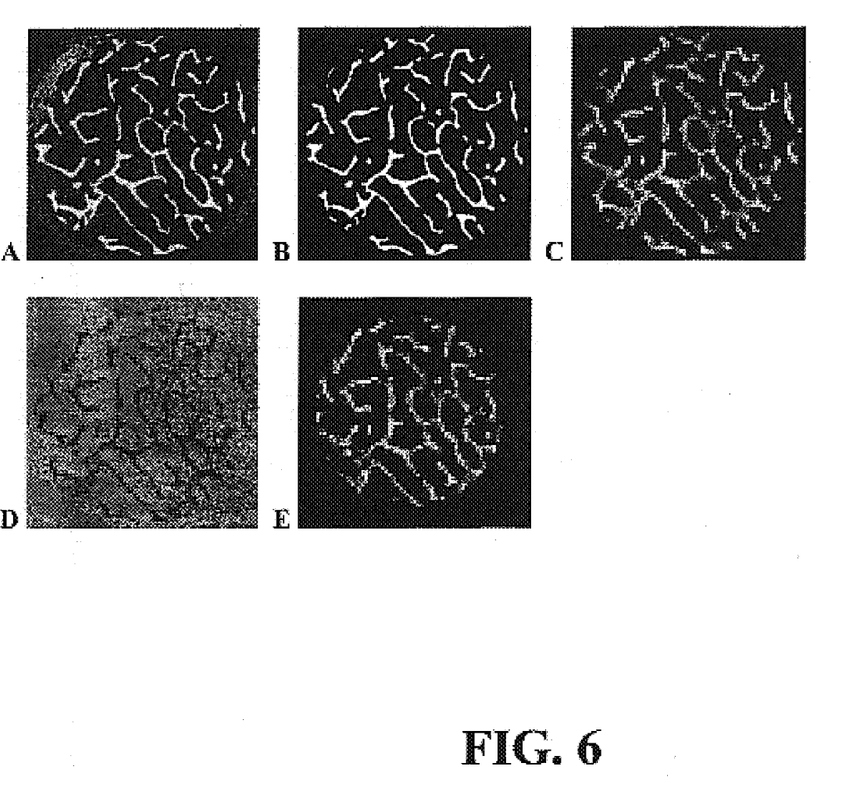
FIGS. 6A–6E depict images of cross-sectional slices of trabecular bone.

Images for evaluating subvoxel processing were generated from a 3D $\mu$-CT image of a cylindrical human radius specimen (FIG. 6A, 9 mm diameter and 9 mm length). The image was acquired with a $\mu$-CT 20 (Scanco Medical, Bassersdorf, Switzerland) at a voxel size of $22 \times 22 \times 22$ $\mu m^3$, and then binarized with a classification threshold halfway between the marrow and bone peaks in the voxel intensity histogram. The method was used for processing in vivo MR forearm images, which are currently acquired with a voxel size of $137 \times 137 \times 350$ $\mu m^3$. Therefore, a "gold standard" BVF map (FIG. 6B) with a voxel size of $33 \times 33 \times 22$ $\mu m^3$ was generated by interpolation, such that increasing each voxel dimension by a factor of a power of two (i.e., a factor of four for the x and y dimensions and a factor of sixteen for the z direction) approximates the corresponding in vivo voxel dimension.

This BVF map is referred to as a "gold standard" since its accuracy is high enough that it is assumed to represent the true spatial distribution of BVF and, thus, may be applied to evaluate the accuracy of image processing methods. To evaluate the method, the gold standard is first purposefully degrading to generate images, which simulate those obtained under less than optimal imaging conditions. The goal of the processing method being tested is to enhance the simulated images by reversing the specific types of degradation (e.g., lower spatial resolution and signal-to-noise ratio) that were applied to the gold standard After processing methods, such as the preferred embodiment of the present invention, are applied to enhance the simulated images, the results may be compared to the gold standard to assess accuracy.

For the purpose of evaluating the preferred embodiment, the gold standard was degraded by averaging neighboring voxels ($4 \times 4 \times 16$ voxels$^3$) to generate a low-resolution BVF map (FIG. 6C) with a voxel size of $132 \times 132 \times 352$ $\mu m^3$. A low-resolution BVF map (FIG. 6C) was subsequently created by averaging neighboring voxels ($4 \times 4 \times 16$ voxels$^3$) to yield a voxel size of $132 \times 132 \times 352$ $\mu m^3$.

To evaluate subvoxel processing in the presence of noise, a simulated 3D MR image was generated (FIG. 6D). Since the MR signal from bone is negligible, the intensity of each voxel in the absence of noise is proportional to its marrow volume fraction (1−BVF):

$$I = (1 - BVF) \times I_{marrow}$$ [Equation 8]

wherein $I_{marrow}$ is the intensity of a voxel which contains only marrow. In the preferred embodiment, $I_{marrow}$ was arbitrarily set to 100. Rician noise, the type of noise inherent to magnitude MR images (Gudbjartsson et al., *Magn. Reson. Med.* 34:910–914 (1995)) was added to simulate a signal-to-noise ratio (SNR), defined as the ratio of the noise standard deviation in one Gaussian channel over the signal, of 10. Thus, both the resolution and the signal-to-noise ratio were typical of in vivo MR images of the forearm (Song et al., 1999).

Evalution of Accuracy—Subvoxel Processing versus Trilinear Interpolation

The accuracy of subvoxel processing was evaluated and compared with trilinear interpolation using the noiseless low-resolution BVF map as input to the algorithms. Subvoxel processing was applied four times to the low-resolution BVF map to return the voxel size to that of the gold standard. Each subvoxel processing iteration decreased voxel size by a factor of two in each dimension. Therefore, groups of four voxels (2×2 voxel$^2$) were averaged in the x, y plane following the first and second iterations, so that the overall reduction in voxel size was a factor of four in the x and y directions, and a factor of sixteen in the z direction. The accuracy was assessed by generating histograms showing the fraction of subvoxels plotted versus the error, computed as subvoxel BVF minus the spatially corresponding voxel BVF in the high-resolution gold standard. Quantitative parameters derived from the histograms include the fraction of subvoxels with zero error and the mean absolute error.

To evaluate the effect of noise on accuracy, subvoxel processing and trilinear interpolation were also applied to the test image with SNR=10. Since subvoxel processing requires an estimate of the BVF in each voxel, the test image was first processed with a fast BVF mapping technique whose details are presented elsewhere (Hwang et al, In. *Proc. Internat'l Soc. Magn. Reson. Med.*, Glasgow; 2001, which is herein incorporated by reference) (FIG. 6E). The method generates BVF maps at the original voxel size of the input image similar to the BVF mapping technique of Hwang et al., 1999. Trilinear interpolation was applied directly to the test image to demonstrate accuracy in the worst case scenario. Subvoxel BVF was then estimated from the interpolated image as $$BVF \approx 1 - I/I_{marrow} \qquad \text{[Equation 9]}$$

Accuracy was assessed using error histograms and the parameters described previously.

Application to In Vivo MR Images

Figure 7:
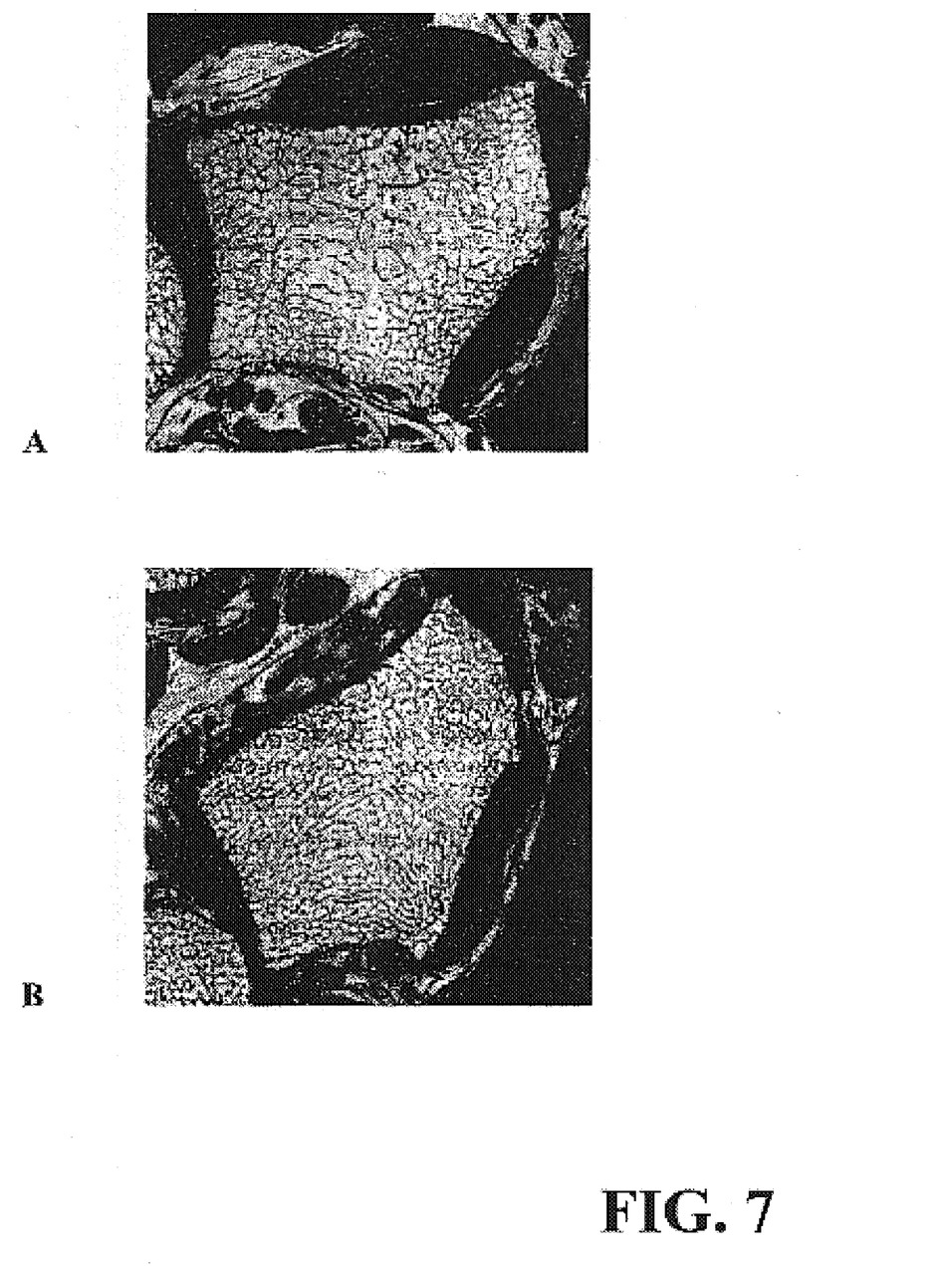
FIGS. 7A and 7B photographically depict cross sections of the radius obtained from in vivo forearm images of two individuals.

To illustrate the effectiveness of the method, subvoxel processing was applied to two in vivo images of trabecular bone (FIG. 7). The images were acquired in the distal radius at 137×137×350 μm$^3$ voxel size (Song et al., 1999; Ma et al., *Magn. Reson. Med.* 35:903–910 (1996)), and were first processed with the fast BVF mapping technique. These images were subsequently subvoxel-processed, binarized and projected to provide a visual impression of the trabecular architecture. Notably, the subject in (FIG. 7B) has a higher number of trabeculae that are homogeneously distributed while the subject in (FIG. 7A) has thicker trabeculae, which are more numerous towards the periphery.

Evaluation of Accuracy

Figure 8:
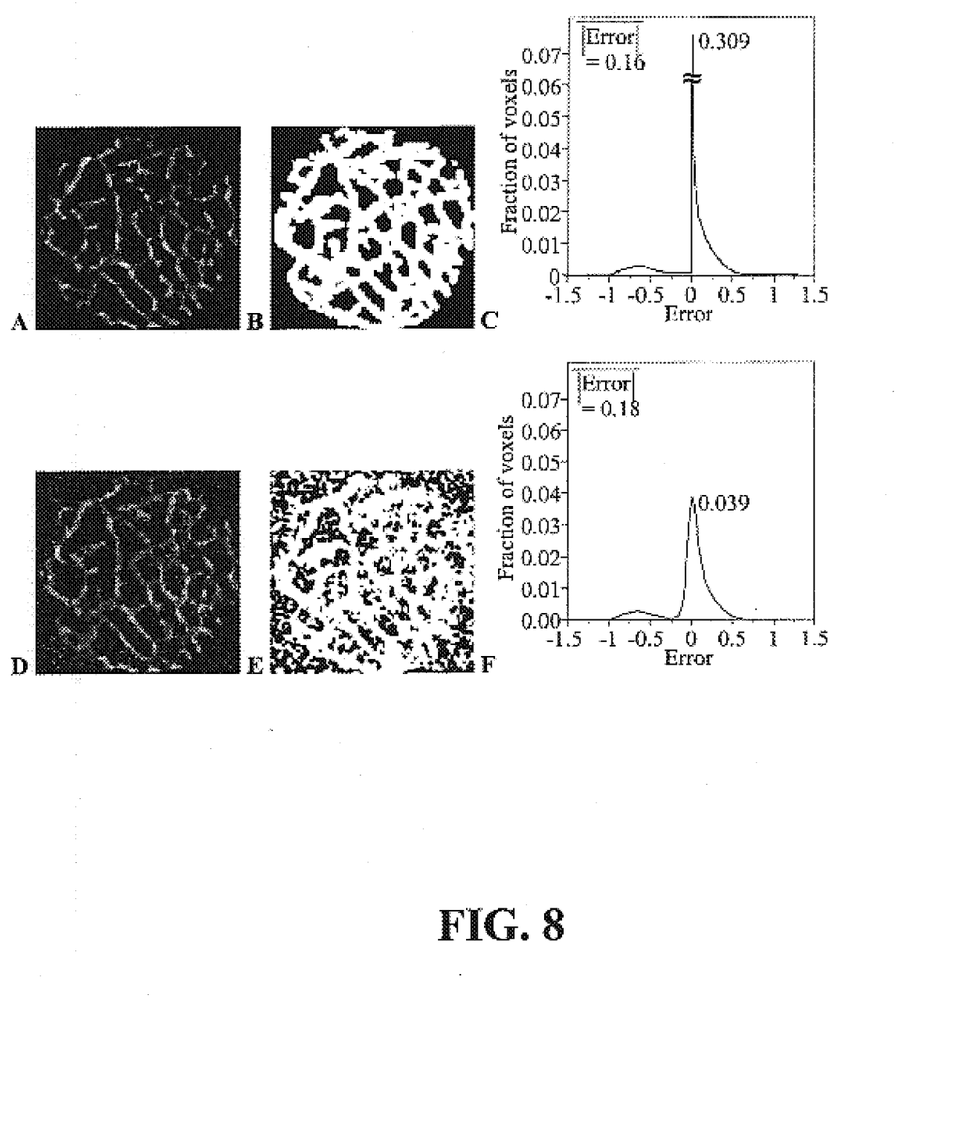

A cross section of the unprocessed image, the gold standard BVF map, the noiseless low-resolution BVF map, and the test image in which SNR=10 are shown in FIGS. 6A–6E. The resulting BVF map (FIG. 6E) shows that the background noise has been removed, but that there is still extensive partial volume blurring. Although trilinear interpolation produces smoother images (FIGS. 8A and 8D), the blurring is evident, especially after thresholding the BVF maps, such that all voxels with BVF>0 appear white (FIGS. 8B and 8E). The error histograms (FIGS. 8C and 8F) show that even in the noiseless case, the mean absolute error was 0.16, and only 31% of the subvoxels were assigned the correct BVF. When SNR was 10, fewer than 4% of the subvoxels were error free.

Figure 9:
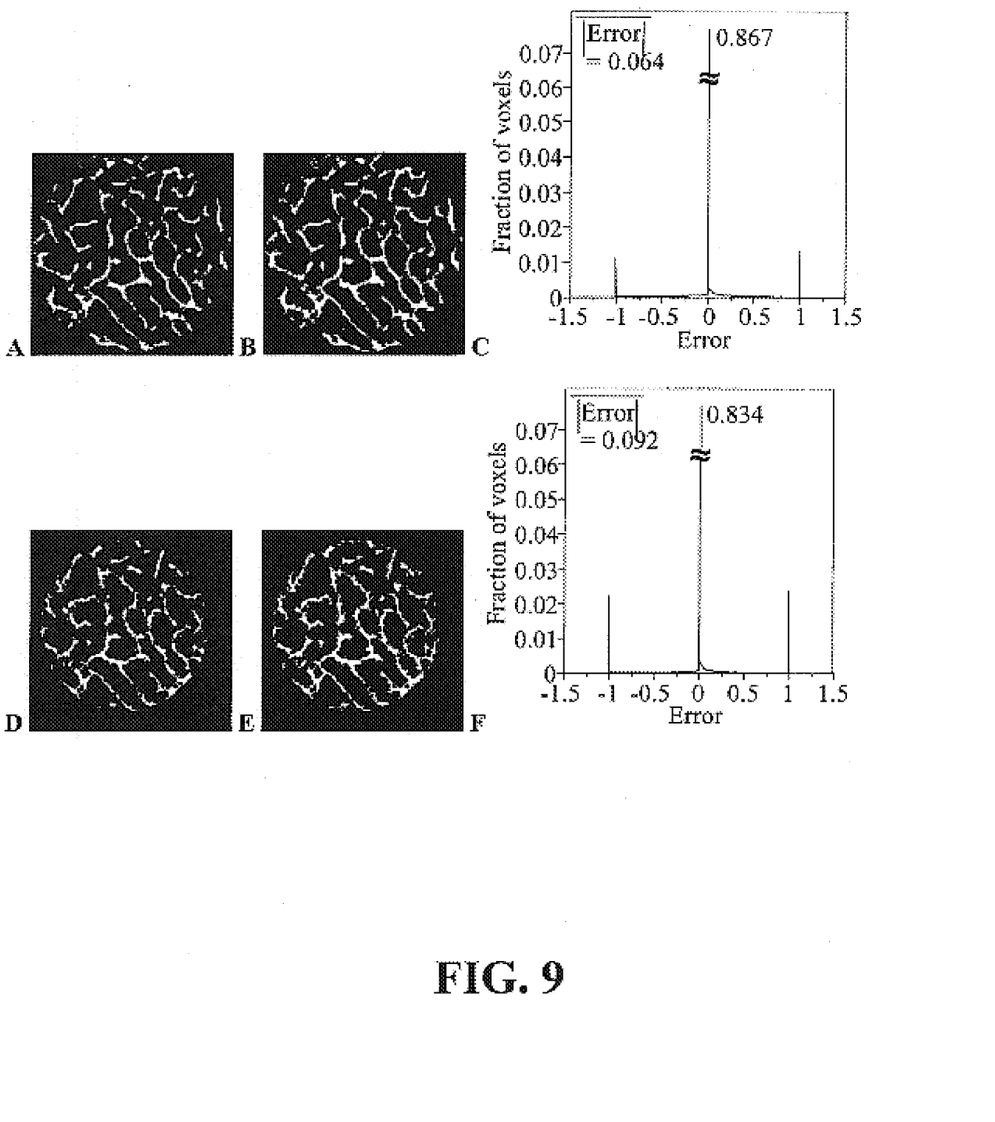
FIGS. 9A–9F depict subvoxel processing of the images shown in FIG. 6.

Furthermore, the low intensities of the BVF maps indicate that none of the voxel BVFs have increased. In contrast, the results of subvoxel processing (FIGS. 9A and 9D) are devoid of blurring and are nearly identical to the thresholded images (FIGS. 9B and 9E). The similarity between the gold standard and the processed test image is striking, especially given the low resolution and signal-to-noise ratio (SNR) of the unprocessed test image (FIG. 6D). The parameters quantifying accuracy are summarized in Table 1, which shows the mean absolute error and the percentage of subvoxels assigned the correct BVFs for both SNR levels.

TABLE 1

Comparison of accuracy between subvoxel processing and linear interpolation.

| Algorithm | SNR | Mean Absolute Error | % Subvoxels with Zero Error |
|---|---|---|---|
| Subvoxel processing | ∞ | 0.064 | 86.7% |
|  | 10 | 0.092 | 83.4% |
| Trilinear interpolation | ∞ | 0.16 | 30.9% |
|  | 10 | 0.18 | 3.9% |

Figure 10:
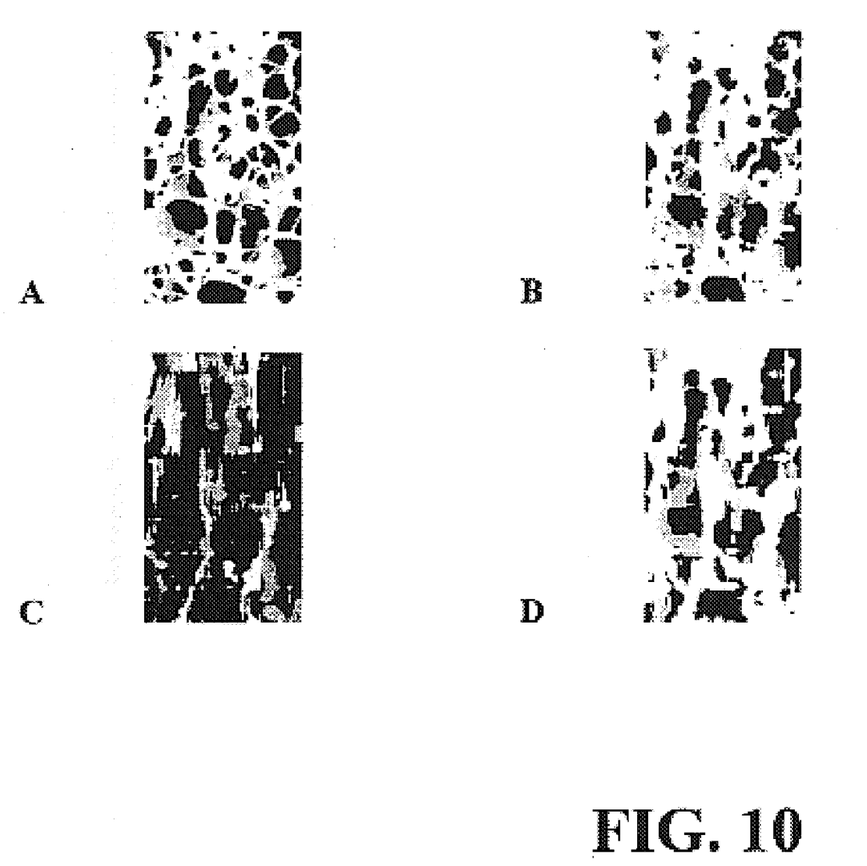
FIGS. 10A–10D depict comparative 3D projection images ($110\times190\times27$ voxel$^3$ VOI).

The results of the different processing approaches are particularly striking in the 3D projection images (110×190× 27 voxel$^3$ VOI), comparing: data from the gold standard (FIG. 10A), the result of subvoxel processing the test image (FIG. 10B), and the output of trilinear interpolation (FIG. 10C). The images were projected after binarizing the data with a threshold of BVF=0.5. Note that the horizontal trabeculae are far better preserved by subvoxel processing, in spite of the initially low image resolution and noise. The projection image in FIG. 10D has also been derived from the trilinearly interpolated data, but after artificially thickening the trabeculae by classifying voxels with BVF>0.25 as bone. Nevertheless, many of the horizontal trabeculae remain unresolved.

Figure 11:
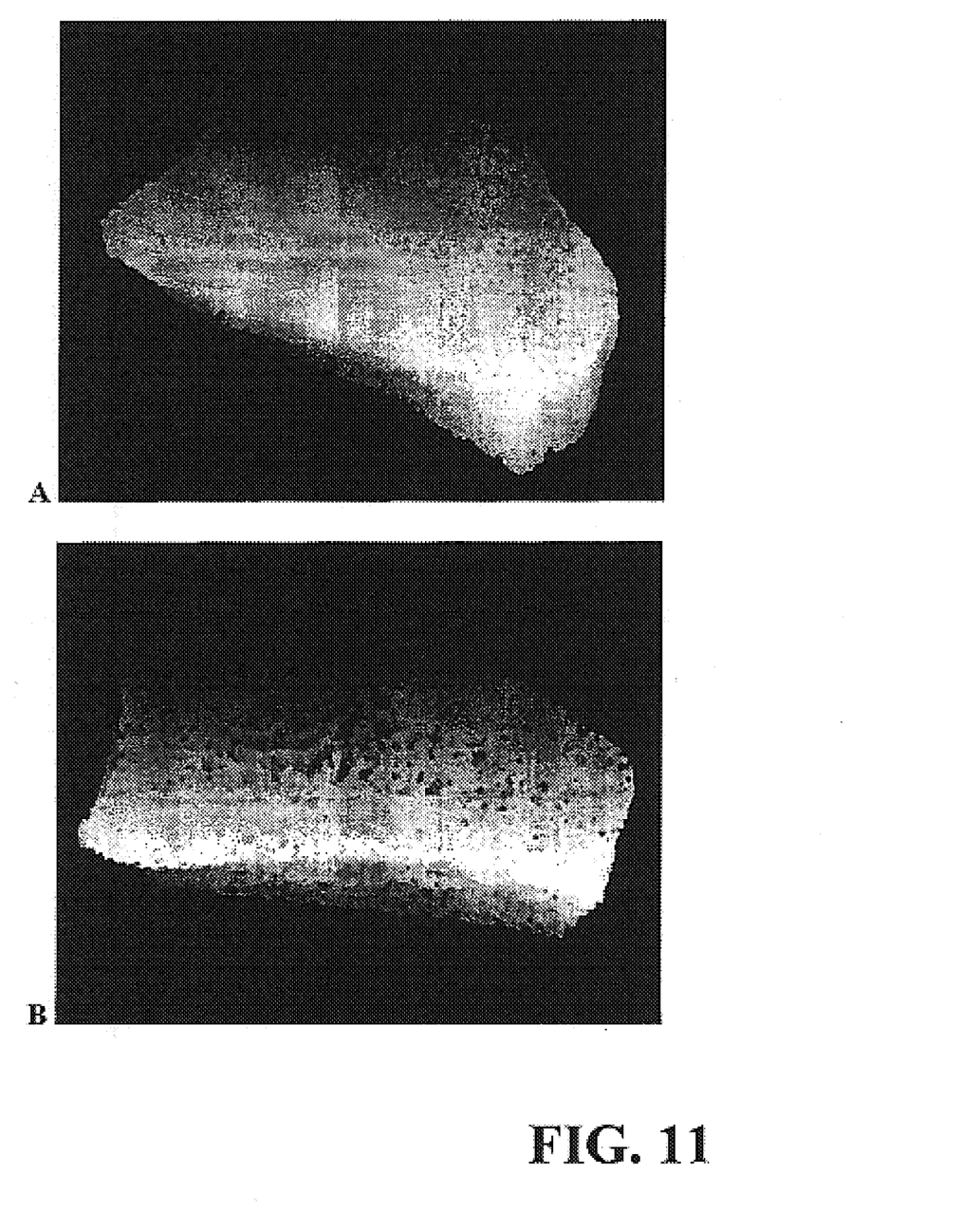
FIGS. 11A and 11B photographically depict 3D projections of the in vivo image shown in FIGS. 7A and 7B.

A final demonstration of the utility of subvoxel processing in accordance with the preferred embodiment of the present invention for enhancing images in the low-resolution regime is shown in FIG. 11, wherein 3D projections are depicted of subvoxel-processed 3D in vivo images of the radius. The anisotropic tubular structure suggesting a predominance of trabeculae along the direction of principal loading is well visualized.

In summary, a method has been presented that greatly alleviates the effects of partial volume blurring in tomographic images of binary systems, i.e., objects possessing only two discrete materials. The results indicate that accurate structural information for characterizing trabecular bone architecture is possible on the basis of MR images acquired in vivo. Such information has been previously obtainable only by histomorphometry or microscopic imaging in bone specimens and biopsies. Thus, the present invention comprises a method and system for noninvasively quantifying the trabecular architecture for predicting fracture risk or for monitoring the efficacy of therapy.

Each and every patent, patent application and publication that is cited in the foregoing specification is herein incorporated by reference in its entirety.

While the foregoing specification has been described with regard to certain preferred embodiments, and many details have been set forth for the purpose of illustration, it will be apparent to those skilled in the art that the invention may be subject to various modifications and additional embodiments, and that certain of the details described herein can be varied considerably without departing from the spirit and scope of the invention. Such modifications, equivalent variations and additional embodiments are also intended to fall within the scope of the appended claims.

We claim:

1. A method to increase apparent image resolution by post-processing an image of a volume comprising material phases having at least two discrete signal intensities, wherein the method comprises:

algorithmically subdividing each voxel of the image into subvoxels;

assigning weights to each subvoxel computed on the basis of local neighborhood criteria and strict mass conservation; and automatically computing a resolution-enhanced image by retaining the original spatial locations of the subvoxels, which have been sorted in terms of assigned weights.

2. The method of claim 1, wherein the images are obtained by an imaging process selected from the group consisting of MRI, CT, ultrasound, nuclear imaging, included emission tomography modalities, light microscopy, electron microscopy, photography, x-ray projection and optical digital imaging.

3. The method of noninvasively producing a bone image having increased resolution by post-processing an image of a bone volume comprising material phases having at least two discrete signal intensities, wherein the method comprises the steps set forth in claim 2.

4. The method of claim 1, wherein subdividing each voxel further comprises subdividing each voxel into eight subvoxels by strictly enforcing conservation of bone mass, such that total solid volume fraction in the original voxel is divided among the subvoxels on a weighted basis, and subvoxels are sorted in order of decreasing weight.

5. The method of claim 4, wherein a subvoxel is determined by the amount and location of solid outside the voxel, but adjacent to the subvoxel; and wherein the weight for each subvoxel is computed as the sum of the voxels adjacent to that subvoxel.

6. The method of claim 5, wherein blurring of the image is eliminated by a repeated algorithmic process, comprising classifying each subvoxel as boundary subvoxel or central subvoxel, based upon output of the original weighting determination, wherein (i) solid-containing subvoxels are classified as boundary or central subvoxels on the basis of adjacency and connectivity criteria; (ii) boundary subvoxels are not assigned a solid weight until the central voxels contain 100% solid; (iii) central subvoxels are filled with solid by assigning primary and secondary weights, wherein solid is partitioned among the subvoxels on the basis of the primary weights; and (iv) boundary subvoxels are similarly filled based upon secondary weights, but the primary weights are set to zero.

7. The method of claim 6, further comprising sorting the subvoxels in order of decreasing primary weights, and further sorting subvoxels having the same primary weight in order of decreasing secondary weights.

8. The method of noninvasively producing a bone image having increased resolution by post-processing an image of a bone volume comprising material phases having at least two discrete signal intensities, wherein the method comprises the steps set forth in claim 7.

9. The method of claim 8, wherein the image of the volume comprises imaging of trabecular bone.

10. The method of claim 9, wherein the image is obtained in vivo.

11. The method of claim 9, wherein the image is obtained ex vivo.

12. The method of noninvasively producing a bone image having increased resolution by post-processing an image of a bone volume comprising material phases having at least two discrete signal intensities, wherein the method comprises the steps set forth in claim 4.

13. The method of noninvasively producing a bone image having increased resolution by post-processing an image of a bone volume comprising material phases having at least two discrete signal intensities, wherein the method comprises the steps set forth in claim 5.

14. The method of noninvasively producing a bone image having increased resolution by post-processing an image of a bone volume comprising material phases having at least two discrete signal intensities, wherein the method comprises the steps set forth in claim 6.

15. The method of noninvasively producing a bone image having increased resolution by post-processing an image of a bone volume comprising material phases having at least two discrete signal intensities, wherein the method comprises the steps set forth in claim 1.

16. The method of claim 15, wherein the image of the volume comprises imaging of trabecular bone.

17. A system to increase apparent image resolution by post-processing an image of a volume comprising material phases having at least two discrete signal intensities, wherein the system comprises:

means for algorithmically subdividing each voxel of the image into subvoxels;

means for assigning weights to each subvoxel computed on the basis of local neighborhood criteria and strict mass conservation; and means for automatically computing a resolution-enhanced image by retaining the original spatial locations of the subvoxels, which have been sorted in terms of assigned weights.

18. The system of noninvasively producing a bone image having increased resolution by post-processing an image of a bone volume comprising material phases having at least two discrete signal intensities, wherein the system comprises the steps set forth in claim 17.

19. A device to increase apparent image resolution by post-processing an image of a volume comprising material phases having at least two discrete signal intensities, wherein the device comprises:

a computer-readable signal-bearing medium;

means in the medium for algorithmically subdividing each voxel of the image into subvoxels;

means in the medium for assigning weights to each subvoxel computed on the basis of local neighborhood criteria and strict mass conservation; and means in the medium for automatically computing a resolution-enhanced image by retaining the original spatial locations of the subvoxels, which have been sorted in terms of assigned weights.

20. The device for noninvasively producing a bone image having increased resolution by post-processing an image of a bone volume comprising material phases having at least two discrete signal intensities, wherein the device comprises the steps set forth claim 19.

* * * * *